(12) United States Patent
Inoue

(10) Patent No.: US 8,312,397 B2
(45) Date of Patent: Nov. 13, 2012

(54) METHOD FOR GENERATING LAYOUT PATTERN OF SEMICONDUCTOR DEVICE AND LAYOUT PATTERN GENERATING APPARATUS

(75) Inventor: Tomoyuki Inoue, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 381 days.

(21) Appl. No.: 12/585,085

(22) Filed: Sep. 2, 2009

(65) Prior Publication Data

US 2010/0152876 A1    Jun. 17, 2010

(30) Foreign Application Priority Data

Sep. 5, 2008  (JP) ................. 2008-228946

(51) Int. Cl.
- G06F 17/50 (2006.01)
- H01L 27/18 (2006.01)
- H01L 23/48 (2006.01)

(52) U.S. Cl. ............... 716/55; 716/51; 716/52; 716/53; 716/54; 257/202; 257/734; 257/736

(58) Field of Classification Search .............. 716/50–55; 257/202, 734, 736
See application file for complete search history.

(56) References Cited

U.S. PATENT DOCUMENTS

| | | | | |
|---|---|---|---|---|
| 5,528,512 A * | 6/1996 | Moriyama | ...................... | 716/55 |
| 6,490,170 B2 * | 12/2002 | Asai et al. | ..................... | 361/794 |
| 7,302,651 B2 * | 11/2007 | Allen et al. | ...................... | 716/52 |
| 7,640,522 B2 * | 12/2009 | Gupta et al. | .................. | 716/119 |
| 7,712,070 B2 * | 5/2010 | Moon | .............. | 716/50 |
| 7,716,626 B2 * | 5/2010 | Goto et al. | ........................ | 716/55 |
| 7,797,668 B2 * | 9/2010 | Chang et al. | .................... | 716/53 |
| 7,844,936 B2 * | 11/2010 | Melzner | ........................ | 716/130 |
| 2009/0055793 A1 * | 2/2009 | Melzner | ........................ | 716/14 |
| 2009/0228854 A1 * | 9/2009 | Sakamoto | ....................... | 716/10 |
| 2009/0254874 A1 * | 10/2009 | Bose | ............................... | 716/6 |
| 2010/0006896 A1 * | 1/2010 | Uemura | ....................... | 257/202 |
| 2010/0076580 A1 * | 3/2010 | Kitahara | ........................ | 700/97 |
| 2011/0316052 A1 * | 12/2011 | Furuta et al. | .................. | 257/204 |

FOREIGN PATENT DOCUMENTS

| | | | |
|---|---|---|---|
| JP | 2897737 | | 3/1999 |
| JP | 2006-108541 | A | 4/2006 |
| JP | 2007080942 | A * | 3/2007 |
| JP | 2009217366 | A * | 9/2009 |

* cited by examiner

*Primary Examiner* — Helen Rossoshek

(74) *Attorney, Agent, or Firm* — McGinn IP Law Group, PLLC

(57) ABSTRACT

In a layout pattern generating method, a specific rework cell used for edition is specified among rework cells and fill cells which are arranged in a semiconductor chip area and a specific pattern of a predetermined shape is generated in a wiring layer for the specific rework cell. A dummy wiring pattern is arranged in at least a part of the wiring layer of and the fill cell and un-specific rework cells among the rework cell other than the specific rework cell. The specific pattern is deleted from the wiring layer for the specifying rework cell. A wiring pattern is arranged in the wiring layer for the specific rework cell by wiring the specific rework cell as a logic cell.

12 Claims, 10 Drawing Sheets

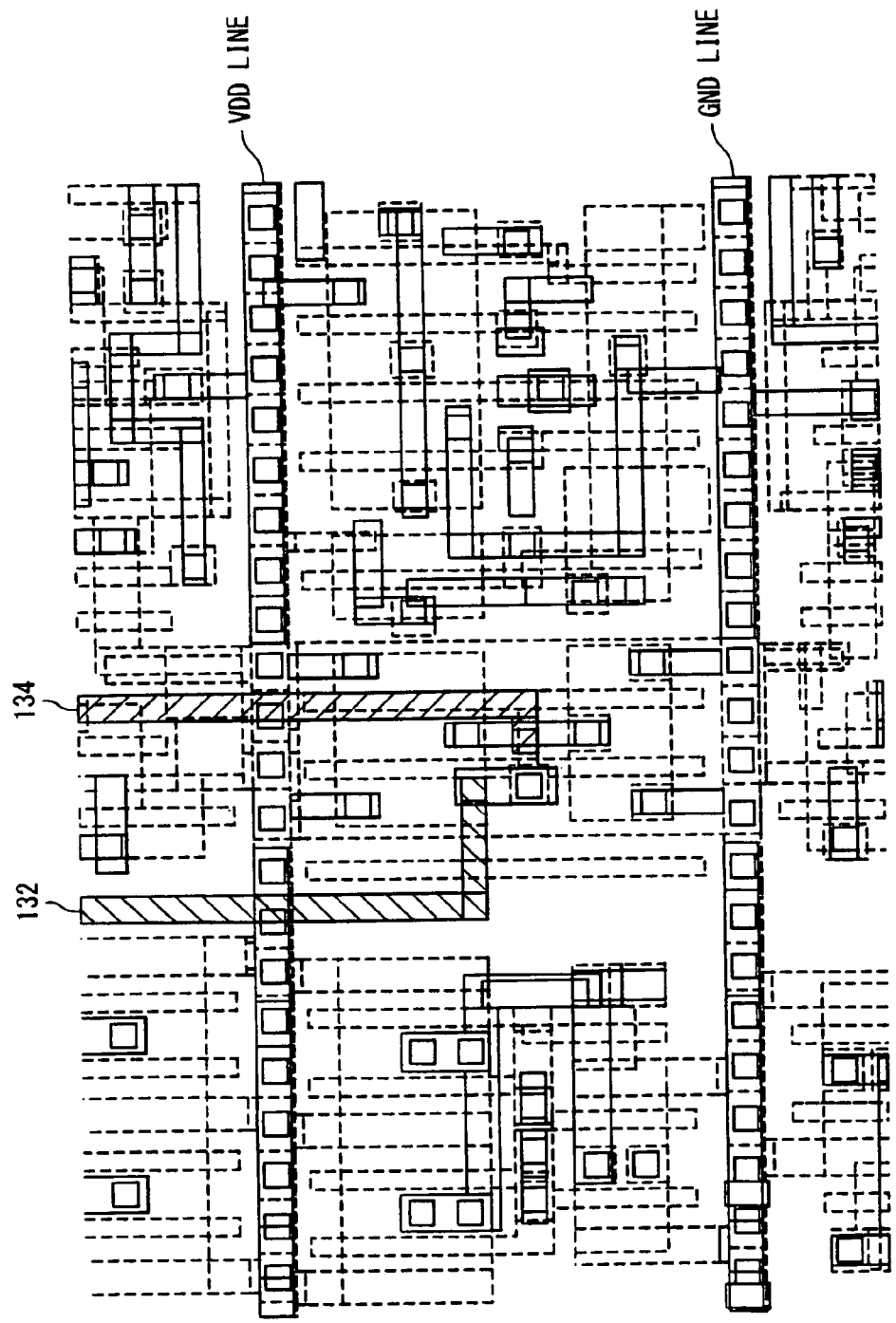

METHOD FOR GENERATING LAYOUT PATTERN OF SEMICONDUCTOR DEVICE AND LAYOUT PATTERN GENERATING APPARATUS

INCORPORATION BY REFERENCE

This patent application claims a priority on convention based on Japanese Patent application No. 2008-228946. The disclosure thereof is incorporated herein by reference.

BACKGROUND OF THE INVENTION

1. Field of the Invention

The present invention relates to a technique of generating a layout pattern of a semiconductor device, and more specifically to a layout pattern generating method, a semiconductor device manufacturing method using the same, and a layout pattern generating apparatus for this method.

2. Description of the Background Art

A semiconductor device such as a system LSI is used in various electronic equipments. In such a semiconductor device, the processing of a finer pattern has been developed, and the function is remarkably improved in recent years. Moreover, sales cycles of new models of the electronic equipments have been shortened, which has advanced a function update period of the semiconductor device.

A semiconductor wafer is divided into chips, and these semiconductor chips are processed for semiconductor devices. A function of the semiconductor device is determined based on cells arranged in a layout area for the semiconductor device and connected to each other. The layout area of the semiconductor device has a lower layer and a wiring layer provided above the lower layer. The lower layer includes a diffusion layer pattern and a gate pattern which are arranged. The wiring layer includes a plurality of layers. For example, in the lowermost wiring layer, an in-cell wiring pattern is generated to connect the gate patterns via contacts, to make the cell to function as a logic cell. In the next wiring layer, an inter-cell wiring pattern for connection between the cells is generated, to achieve a desired function. The wiring layer may further include another wiring layer.

As the processing of a finer pattern is advancing in the semiconductor device, there arises a variance in a width of a wiring pattern after etching, depending on a pattern density distribution. As a result of this, when the pattern becomes thinner than a necessary width, there arises a problem that, flatness of a surface of an interlayer insulating film cannot be ensured when a CMP (Chemical Mechanical Polishing) process is executed in a post-process. Moreover, when the pattern density distribution varies, there is a possibility that the contact is not connected satisfactorily to the wiring pattern.

For these reasons, it is desirable that a wiring pattern density (a wiring pattern occupation rate) is constant over the layout area of the semiconductor chip. However, even if the wiring pattern density over the layout area varies to some extent, it is desirable that the wiring pattern density is constant in a local area. Needless to say, it is desirable that the wiring pattern density is constant over an entire area of the semiconductor wafer.

Today, a layout pattern generation process for a system LSI is performed, but in order to maintain the wiring pattern density uniform, a dummy wiring pattern is arranged on rework cells in addition to fill cells. However, there is a case that a generated layout has a problem on the operation, so that the rework cell needs to be converted into a logic cell. In such a case, in a state that the dummy wiring pattern is provided in the wiring layer, the rework cell is converted to the logic cell by an in-cell wiring pattern, and is further connected to another cell by an inter-cell wiring pattern. At this time, the wiring pattern may form a short circuit with the dummy wiring pattern. In this case, the dummy wiring pattern provided for the rework cell to be converted to the logic cell needs to be removed individually, and man hour of this operation is not small.

A technique of arranging a dummy wiring pattern is disclosed in Japanese Patent Application Publication (JP-P2006-108541A: a first conventional example). Referring to FIG. 1, a layout pattern generating method of the first conventional example in this document will be described.

Referring to FIG. 1, at step S202, databases such as a net list and a cell library are prepared based on a desired function. Subsequently, at step S204, by referring to the net list and the cell library, a cell pattern of macro cells and logic cells is automatically arranged in a layout area of a semiconductor chip area in order to achieve a desired function, and rework cells and fill cells are automatically arranged in a scattered manner. Then, an automatic wiring process is executed in accordance with the net list. Subsequently, at step S206, a dummy wiring (dummy metal) pattern inserting process is performed. In this process, a dummy wiring pattern is arranged for the rework cells and the fill cells. Details of this will be described below. Then, at step S208, the dummy wiring pattern in a cell area where the rework cell needs to be converted to a logic cell is removed. Subsequently, at step S210, by an in-cell wiring pattern and an inter-cell wiring pattern, the rework cell is converted into the logic cell to add a desired logic function.

Next, details of the dummy wiring pattern arranging process will be described with reference to FIG. 2.

At step S102, a process of generating the dummy wiring pattern on the rework cells and the fill cells is performed. Subsequently, at step S104, a wiring pattern occupation rate (density distribution) in an area where the logic cell is arranged is calculated. At step S106, based on the wiring pattern occupation rate, a distribution of the wiring pattern occupation rates is calculated by averaging over the entire cell area in units of small areas. Subsequently, at step S108, the wiring pattern occupation rate in a macro area where a macro cell is arranged is calculated. Next, at step S110, an area where the dummy wiring pattern should be generated is set. In this area, the rework cells and the fill cells are arranged. Subsequently, at step S112, the dummy wiring pattern around the macro cell is removed. Then, at step S114, an occupation rate of the wiring pattern around the macro cell is calculated. At step S116, based on the calculation result of the wiring pattern occupation rate, a target occupation rate of the wiring pattern at the cell or the area is set. At step S118, the dummy wiring pattern is determined. At step S120, it is determined whether or not the target occupation rate is met with the determined dummy wiring pattern. When it is determined that the target occupation rate is not met, step S118 is executed again. When it is determined that the target occupation rate is met, step S122 is executed. At step S122, the determined dummy wiring pattern is generated on the rework cells and the fill cells.

In connection with the above description, Japanese Patent No. 2,897,737 (second conventional example) discloses a logic synthesizing apparatus of a semiconductor integrated circuit. However, in the second conventional example, circuit connection data in a logic level is targeted while a layout design is not targeted.

Therefore, as could be understood, it is desired that a dummy wiring pattern to be arranged for a rework cell can be efficiently deleted. However, in this case, in a currently used layout pattern generating system, an entire system needs to be reconfigured when a data form is changed.

SUMMARY OF THE INVENTION

Therefore, it is desired that a layout pattern can be generated and edited easily in a layout pattern generating apparatus while maintaining system basic functions.

In an aspect of the present invention, a layout pattern generating method is achieved by specifying a specific rework cell used for edition, among rework cells and fill cells which are arranged in a semiconductor chip area and generating a specific pattern of a predetermined shape in a wiring layer for the specific rework cell; by arranging a dummy wiring pattern in at least a part of the wiring layer of and the fill cell and un-specific rework cells among the rework cell other than the specific rework cell; by deleting the specific pattern from the wiring layer for the specifying rework cell; and by arranging a wiring pattern in the wiring layer for the specific rework cell by wiring the specific rework cell as a logic cell.

In another aspect of the present invention, a method of manufacturing a semiconductor device is achieved by generating a layout pattern based on the layout pattern generating method as described above; by producing a mask based on the layout pattern; and by manufacturing a semiconductor device by using the mask.

In still another aspect of the present invention, a computer-readable recording medium in which a computer-executable program code is stored to attain the layout pattern generating method as described above.

In yet still another aspect of the present invention, a layout pattern generating apparatus includes a net list configured to store connection data in a semiconductor device; a cell library in which pattern data of cells including rework cells and fill cells are stored; a display unit; and a layout pattern generating and editing section configured to arrange the pattern data of the cells, including the rework cells and the fill cells, in a semiconductor chip area based on the connection data to display on the display unit, calculate a distribution of wiring occupation rates in the semiconductor chip area and an average of the wiring occupation rates, and generate a previous layout pattern in which a dummy wiring pattern is arranged in a wiring layer based on the distribution of the wiring occupation rates and the average. The layout pattern generating and editing section generates a new layout pattern by deleting the dummy wiring pattern, specifying a specific rework cell among the arranged rework cells, generating a specific pattern of a predetermined shape in a wiring layer of the specific rework cell, arranging a new dummy wiring pattern in at least a part of the wiring layer of un-specific rework cells other than the specific rework cell of the rework cells and the fill cells, deleting the specific pattern from the wiring layer of the specific rework cell, arranging the specific rework cell as a logic cell, and arranging a wiring pattern in the wiring layer of the specific rework cell, when a part of the arranged rework cells is used as the logic cell.

According to the present invention, while making the best use of a function of a conventional layout pattern generating apparatus, a problem of short circuit generation by a dummy wiring pattern can be solved.

Moreover, while a wiring pattern occupation rate at this point is kept constant in a cell or an area narrower than the cell, a rework cell can be changed to a logic cell with small man hours.

BRIEF DESCRIPTION OF DRAWINGS

The above and other objects, advantages and features of the present invention will be more apparent from the following description of certain embodiments taken in conjunction with the accompanying drawings, in which:

FIG. 9 is a pattern diagram showing a layout pattern generating method using the specific wiring pattern.

DESCRIPTION OF PREFERRED EMBODIMENTS

Hereinafter, a layout pattern generating apparatus according to the present invention will be described with reference to the attached drawings.

First Embodiment

Figure 1:
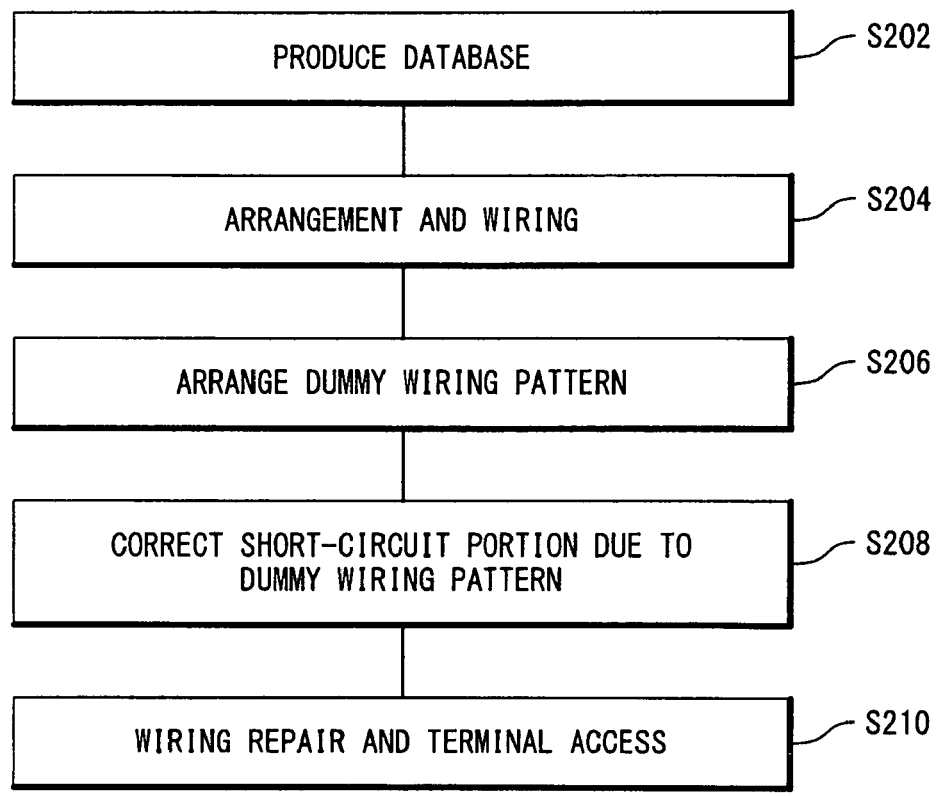
FIG. 1 is a flowchart showing a conventional layout designing procedure.
Figure 2:
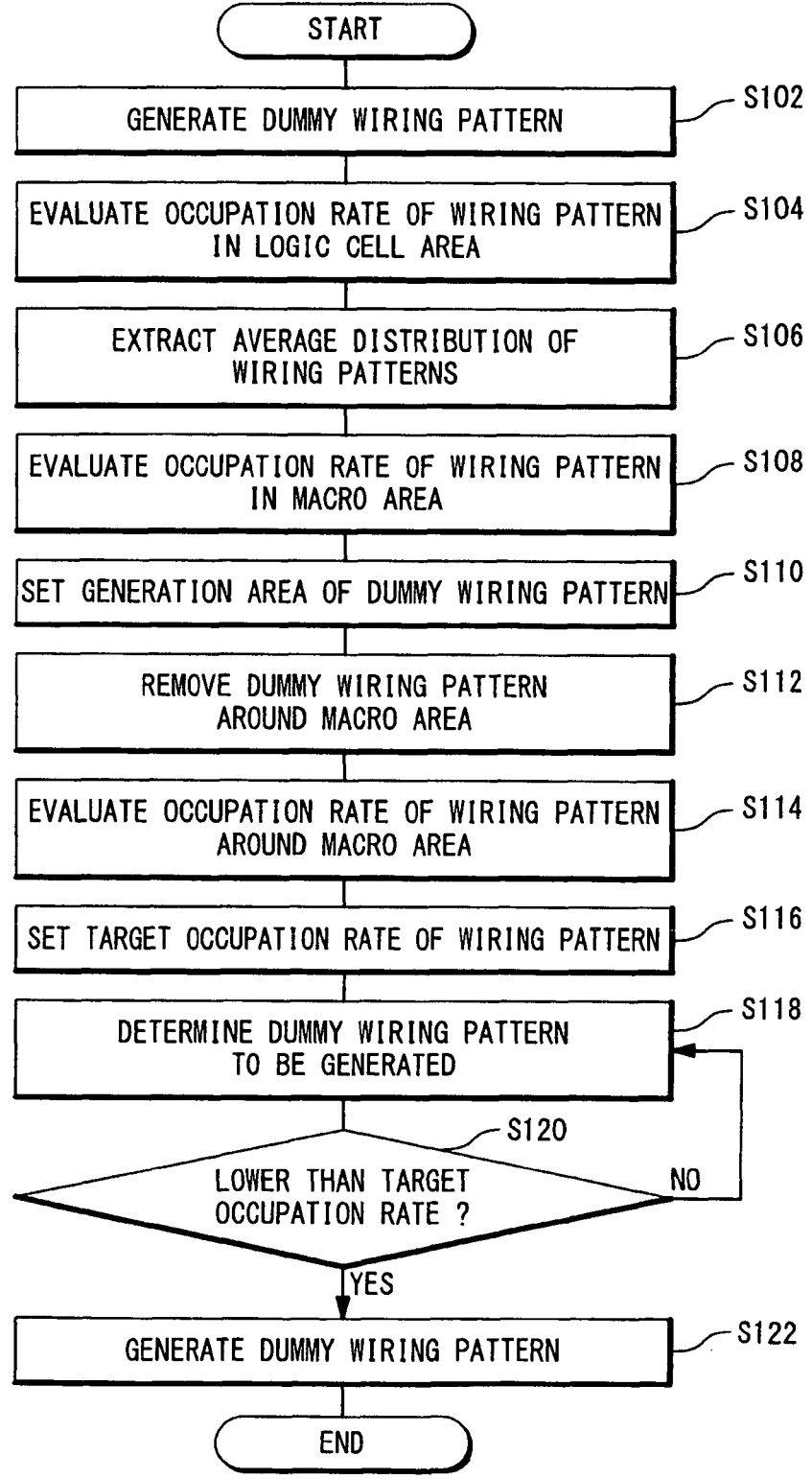
FIG. 2 is a flowchart showing details of dummy wiring pattern arranging process in the procedure of FIG. 1.
Figure 3:
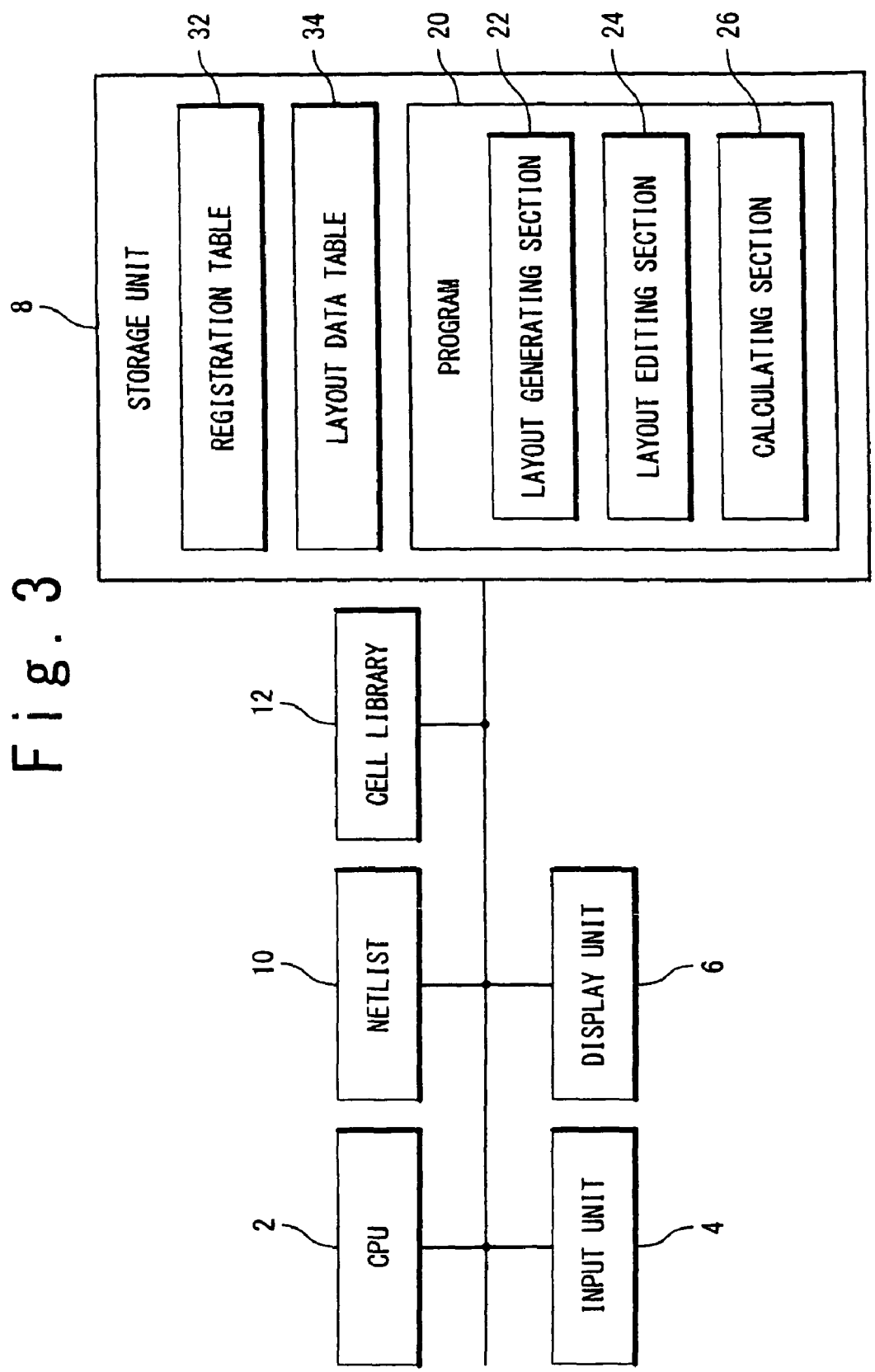
FIG. 3 is a block diagram showing a configuration of a layout pattern generating apparatus according to the present invention.

FIG. 3 is a block diagram showing a configuration of a layout pattern generating apparatus according to the present invention. Referring to FIG. 3, the layout pattern generating apparatus includes a CPU 2, an input unit 4, a display unit 6, a storage unit 8, a net list 10, and a cell library 12. What are stored in the storage unit 8 are: a registration table 32, a layout data table 34, and a computer program 20. This program 20 is loaded from a storage medium (not shown) into the storage unit 8 and executed by the CPU 2. Through the execution of the program 20 by the CPU 2, functions of a layout generating section 22, a layout editing section 24, and a calculating section 26 are realized.

The input unit 4 is used to input data or a command through a keyboard or a mouse. The display unit 6 is such as a liquid crystal display, and may be a printer or the like. The display unit 6 displays a layout pattern generated or edited. The net list 10 stores wirings of cells arranged in a semiconductor chip area. Various kinds of cells are stored in the cell library 12. As various kinds of cells, for example, there are known macro cells for patterns of circuit blocks such as a CPU, a DRAM memory, and a flush memory; logic cells for patterns of logic circuits; rework cells which are cells which are not usually used but which can be converted into logic cells during edition; fill (dummy) cells for filling an empty space; and input/output cells for inputting/outputting data or a command. It should be noted that even same kind of logic cells differ from each other, depending on power supply voltages or current capacitance. Thus, various kinds of cells are stored in the cell library depending on a logic function, a power supply voltage, a current capacitance, a cell size, a cell shape, etc.

A layout pattern has various kinds of cells arranged in a plan view, however, the layout pattern has a hierarchy structure of a lower layer and a wiring layer provided above the lower layer. Therefore, each of the cells has a lower layer and a wiring layer. The wiring layer has a plurality of layers.

The lower layer includes a diffusion layer pattern layer, a power supply pattern layer, and a gate pattern layer. For example, in FIG. 7A, the rework cell for an inverter has a P-type diffusion layer pattern 102 and an N-type diffusion layer pattern 106 as diffusion layer patterns, and a gate pattern 104 above the diffusion layer patterns 102 and 106. As power supply patterns, a power supply voltage (VDD) pattern and a ground voltage (GND) pattern are arranged at the top and bottom of the cell.

Figure 7A:
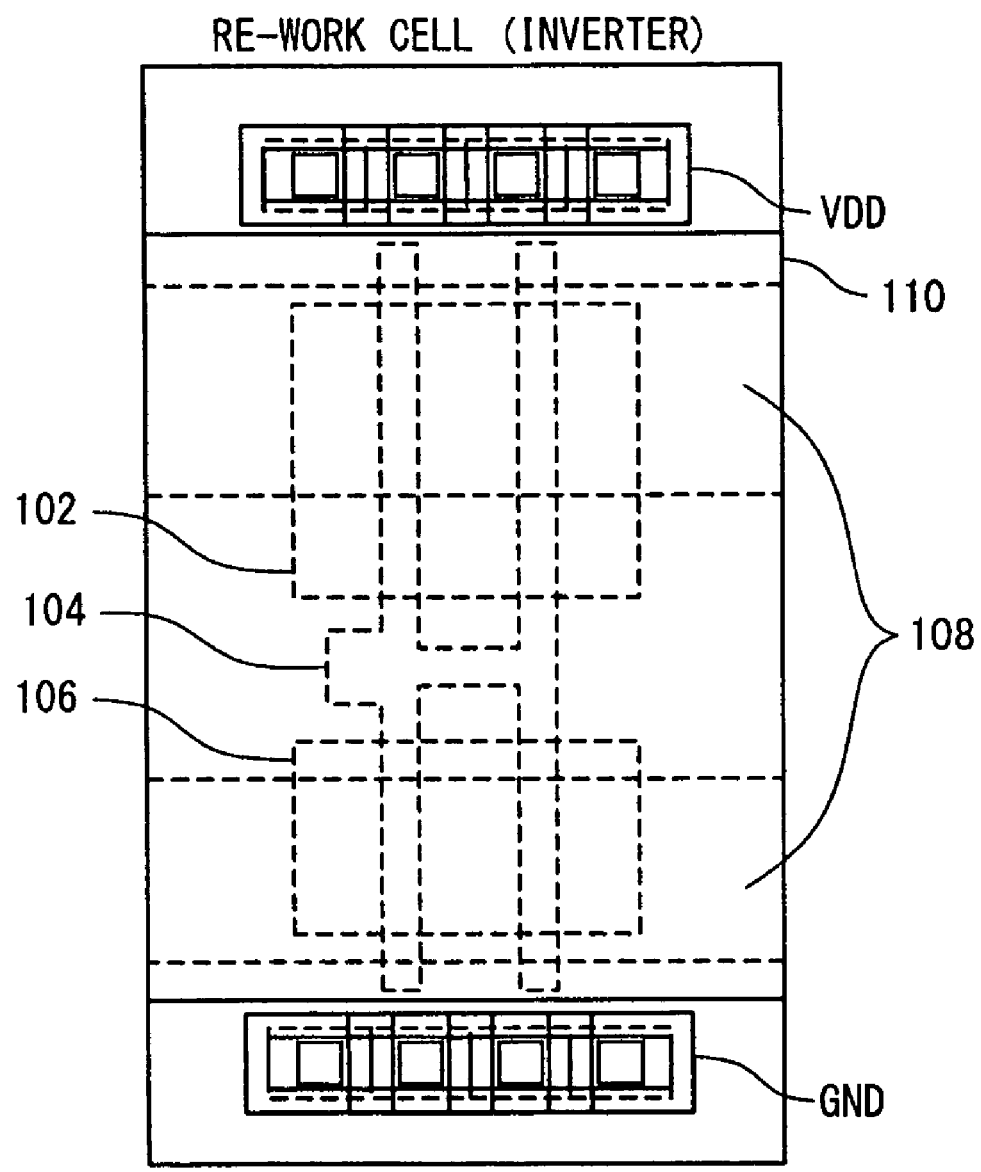
FIG. 7A is a diagram showing a cell pattern of a rework cell (inverter)
Figure 7B:
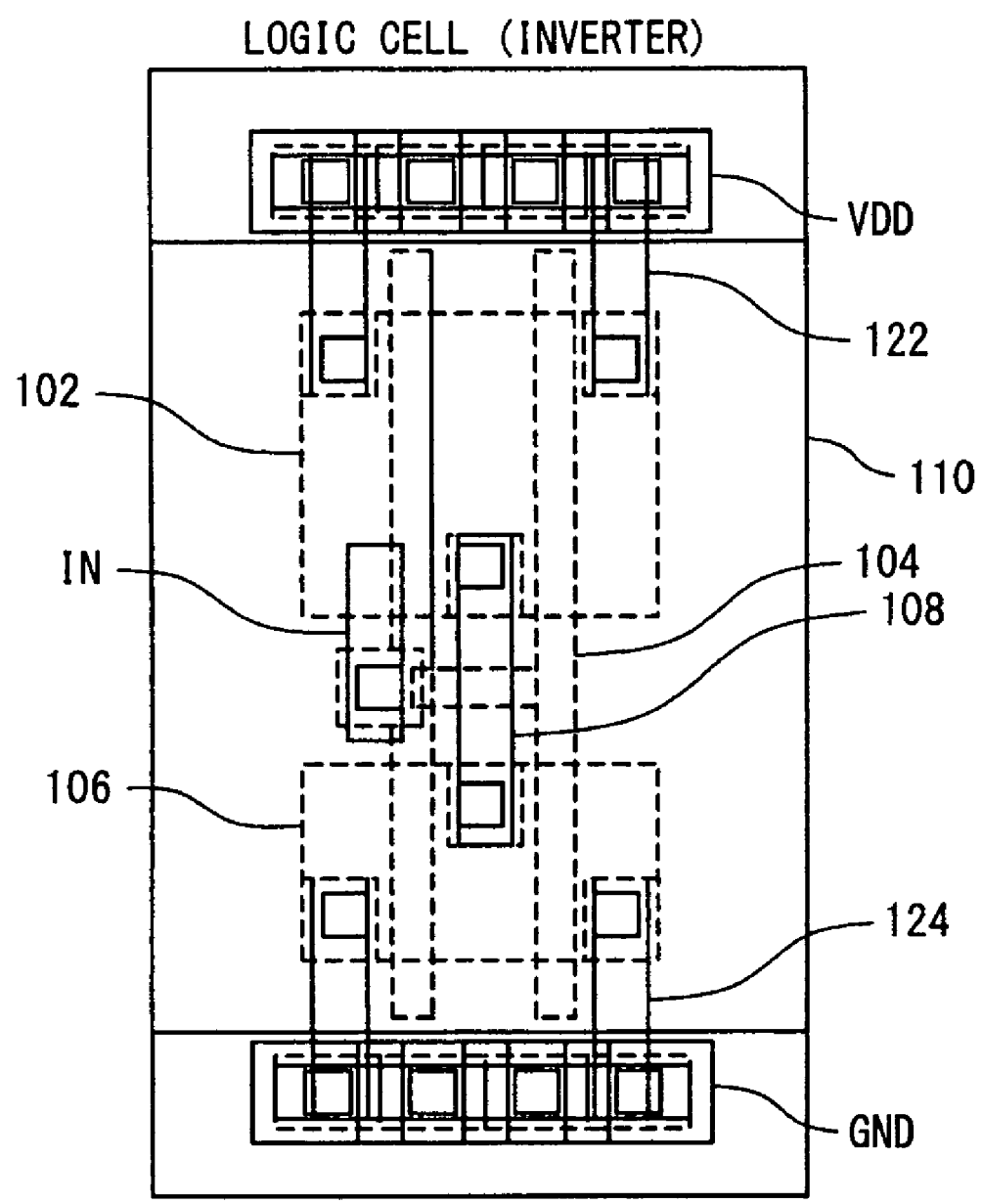
FIG. 7B is a diagram showing a cell pattern when the rework cell (inverter) is converted into a logic cell.

FIG. 7B shows an in-cell wiring pattern and contacts which are added when the rework cell shown in FIG. 7A is converted to a logic cell (inverter cell). A voltage wiring pattern 122 extending from the power supply voltage pattern to the P-type diffusion layer pattern 102 is generated as the in-cell wiring pattern. Also, a ground wiring pattern 124 extending from the ground voltage pattern to the N-type diffusion layer pattern 106 is generated as the in-cell wiring pattern. In addition, a wiring pattern IN that receives an input signal addressed to the inverter, and a wiring pattern OUT that outputs an output signal of the inverter is generated as the in-cell wiring pattern. As described above, the wiring pattern for permitting the rework cell to function as the logic cell is typically provided at a lowermost layer in the wiring layer.

A wiring pattern for wiring the generated logic cell to a different cell is typically provided for a layer above the lowermost layer as an inter-cell wiring pattern.

When the rework cell is not used as the logic cell, a dummy wiring pattern 108 is provided for the wiring layer. The dummy wiring pattern 108 shown in FIG. 7A is specified based on the wiring occupation rate. In the present embodiment, the wiring layer may include a plurality of layers, on all of which the dummy wiring pattern 108 is arranged. However, the dummy wiring pattern 108 may be provided for one of the plurality of layers, for example, the in-cell wiring layer or the inter-cell wiring layer.

Figure 5:
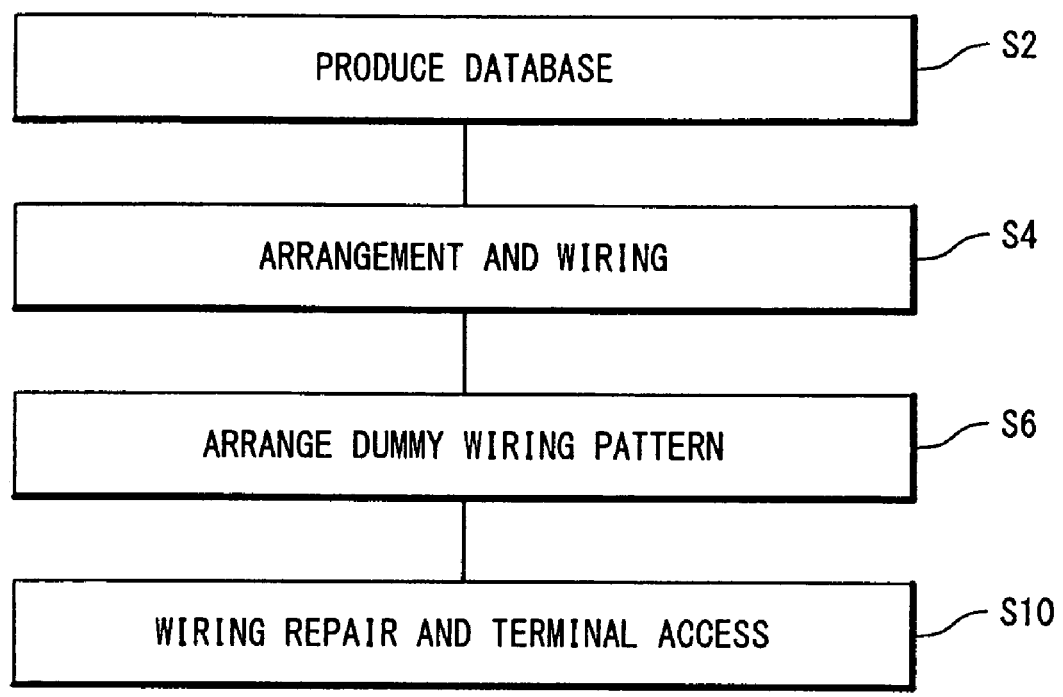
FIG. 5 is a flowchart showing a layout pattern generating process according to the present invention.

Next, a layout pattern generating process by the layout pattern generating apparatus according to the present invention will be described with reference to FIG. 5.

At step S2, the CPU 2 loads the program 20 from the storage medium (not shown) into the storage unit 8, and then executes this program 20. Thus, the layout generating section 22, the layout editing section 24, and the calculating section 26 are realized.

At step S4, in response to an instruction from a user via the input unit 4, the layout generating section 22 refers to the cell library 12 based on the net list 10 to read patterns of macro cells and logic cells, and arranges them in a generation area of the semiconductor chip area. The net list 10 stores an inter-cell wiring state, and at the same time, stores data for specifying each of the cells. Based on this data, even if the same function is included, a cell specified based on required current capacitance, driving capability, cell size, cell shape, etc. is arranged. As a result, in the generation area, cells that would be required to achieve a desired function are arranged. For a cell arrangement, the cells are arranged based on a conventionally known technique. For example, a large-sized macro cell is first arranged, and then the cells such as the logic cell are arranged around the macro cell.

The layout generating section 22 registers a coordinate position of each of the arranged cells, a size of each cell, etc. into the layout data table 34 in relation with the data specifying this cell. A format of the data of each of the cells registered at this point is the same as that of a conventional layout pattern generating apparatus.

Subsequently, at step S4, the layout generating section 22 refers to the net list 10 to automatically generate the inter-cell wiring pattern and performs wiring to achieve a function of an entire semiconductor device. The layout generating section 22 registers into the layout data table 34 the coordinate position, the size, etc. of the inter-cell wiring pattern generated at this time, together with the data specifying the wiring layer where this wiring pattern is arranged. In this manner, the function of the entire semiconductor device is achieved.

Moreover, at step S4, the rework cells are arranged in a currently empty portion in the generation area and the fill cells are arranged in the remaining area. At this point, the layout generating section 22 determines where the rework cells and the fill cells should be arranged, by a predetermined algorithm as is conventionally practiced. At this point, as the rework cell, a rework cell for an inverter may be used or a rework cell for an AND gate circuit may be used. The rework cell is selected based on the logic cell considered to possibly become necessary.

The layout generating section 22 registers a coordinate position, a size, etc. of each of the arranged rework cells and fill cells into the layout data table 34.

Subsequently, at step S6, the layout generating section 22 generates a dummy wiring pattern in the wiring layer, and registers it into the layout data table 34. This step will be described in detail later.

Subsequently, at step S10, by the in-cell wiring pattern and the inter-cell wiring pattern, the rework cell is converted into the logic cell, and further added to a desired logic function. The in-cell wiring pattern and the inter-cell wiring pattern generated at this point are registered into the layout data table 34.

Figure 6:
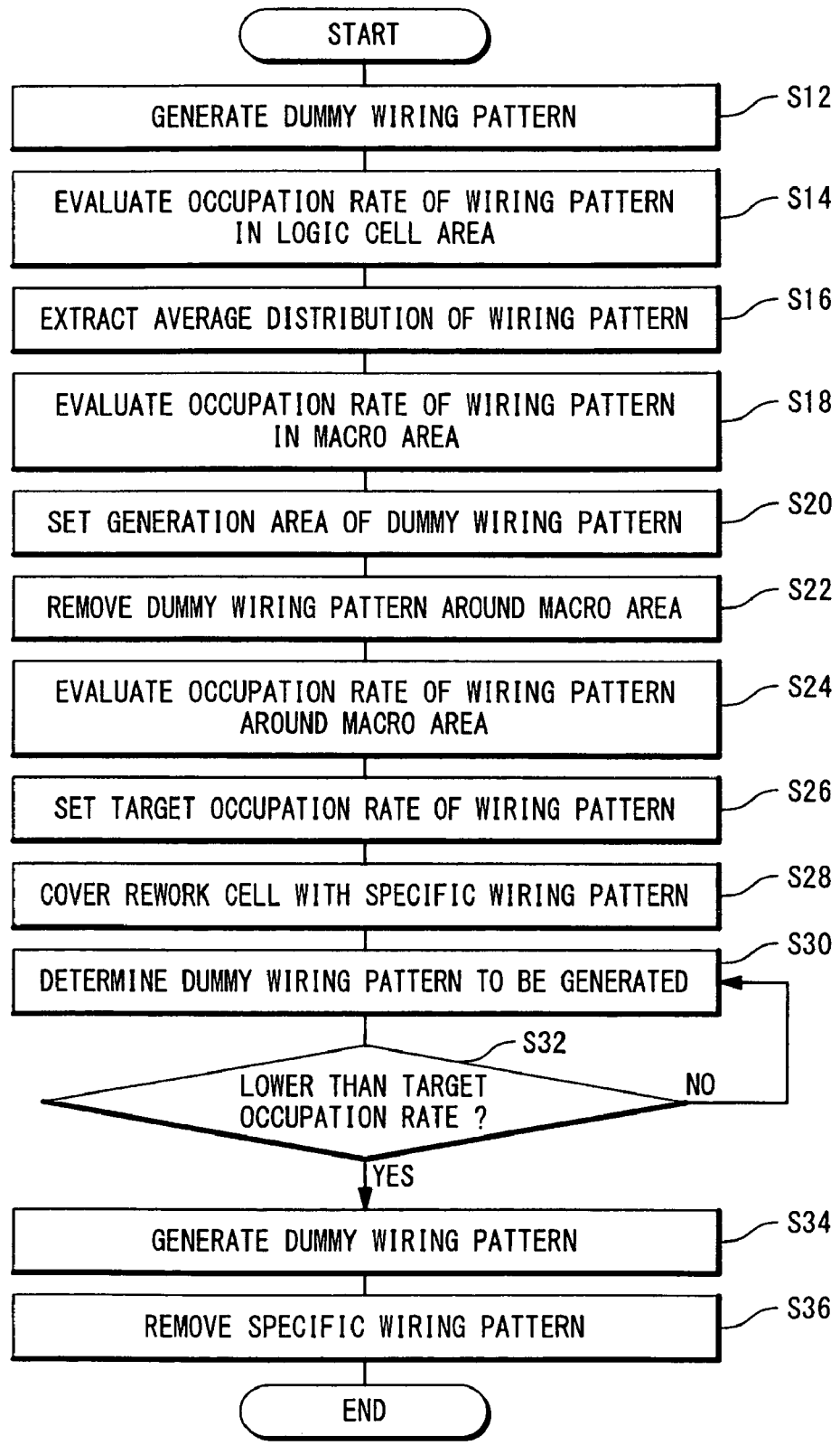
FIG. 6 is a flowchart showing details of dummy wiring pattern arranging process in the procedure of FIG. 5.

Next, details of step S6 in which the dummy wiring pattern is arranged will be described below with reference to FIG. 6.

At step S12, a process of generating a temporary dummy wiring pattern for the arranged rework cells and fill cells is performed. Subsequently, at step S14, the layout generating section 22 controls the calculating section 26 to calculate an occupation rate of the dummy wiring (metal wiring) pattern in each area including at least one logic cell. At step S16, when an occupation rate in an entire layout area of the semiconductor chip is calculated in this manner, the layout generating section 22 controls the calculating section 26 to detect a distribution of the occupation rates of the dummy wiring pattern in the areas at step S14 and an average of the occupation rates. Subsequently, at step S18, the layout generating section 22 controls the calculating section 26 to calculate the occupation rate of the dummy wiring pattern in an area where the macro cell is arranged.

Thus, at step S20, the layout generating section 22 determines and sets an area where the dummy wiring pattern should be arranged, based on the distribution of the occupation rates of the dummy wiring pattern obtained at the step S16, and the occupation rate of the dummy wiring pattern and a coordinate position thereof in the macro cell obtained at step S18. In this area, the rework cells and the fill cells have been arranged. Subsequently, at step S22, the dummy wiring pattern around the macro cell is removed or deleted, and then, at step S24, the occupation rate of the wiring pattern around the macro cell is calculated. At step S26, based on a result of this calculation, a target occupation rate of the wiring pattern in the cell or the area is set. Thereafter, the dummy wiring pattern temporarily set at step S12 is removed or deleted.

Figure 8:
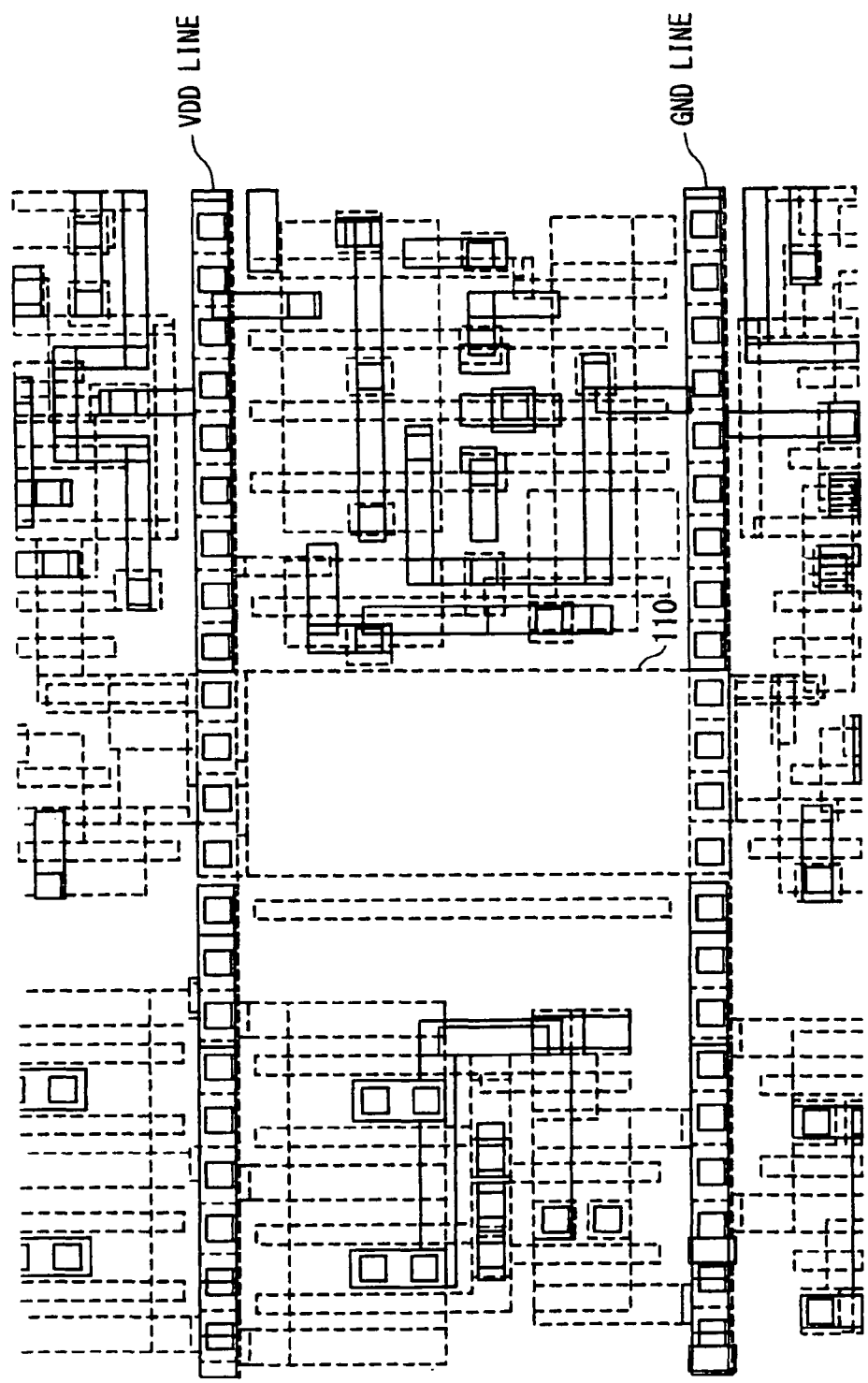
FIG. 8 is a pattern diagram showing a specific wiring pattern generating process.

Next, at step S28, the layout editing section 24 refers to the layout data table 34 to search all the rework cells and arranges a specific wiring pattern having a specific pattern shape in the cell. In this example, the specific wiring pattern is included in all the rework cells, however, the specific wiring pattern may be arranged in only a specific rework cell. In this case, the specific wiring pattern is arranged in only the rework cell specified by the input unit 4 on a layout displayed on the display unit 6. The specific wiring pattern is previously determined depending on a type of rework cell. For example, the shape of the specific wiring pattern differs between a rework cell of an inverter and a rework cell of an AND gate. At this time, the specific wiring pattern may occupy a partial area of the rework cell occupy the entire area of the rework cell. FIG. 8 shows an example where the specific wiring pattern is set in the entire area of the rework cell for the inverter. This specific wiring pattern is satisfactory as long as it covers an area where the dummy wiring pattern is generated, but considering easiness to manage this data, it is desirably a pattern of the entire area of the rework cell.

The layout editing section 24 registers the specific wiring pattern into the layout data table 34 and the registration table 32, together with data specifying the rework cell, a coordinate data thereof, a data indicating the shape thereof, etc. At this point, the specific wiring pattern is registered for all the layers of the wiring layer, but it may be registered for a part thereof.

Next, at step S30, the layout editing section 24 determines the dummy wiring pattern by referring to the cell library 12. At step S32, it is determined whether or not the set target occupation rate is achieved with the determined dummy wiring pattern. When it is determined that the target occupation rate is not achieved, step S30 is executed again, and the layout editing section 24 selects the next dummy wiring pattern by referring to the cell library 12. When it is determined that the target occupation rate is achieved, step S34 is executed. In this manner, the dummy wiring pattern is generated on all the fill cells and rework cells. At this time, the layout editing section 24 registers the dummy wiring pattern in the layout data table 34 in association with the fill cell or the rework cell. Moreover, the layout editing section 24 may register the dummy wiring pattern for all or a part of the layers of the wiring layer. When the registration is carried out for the part of the layers, it is carried out in correspondence with the layer where the specific wiring pattern is registered.

At step S36, the layout editing section 24 refers to the registration table 32 to collectively delete the data of the specific wiring pattern registered in the registration table from the layout data table. As a result, the dummy wiring pattern is deleted from the wiring layer in which the dummy wiring pattern has been generated. Therefore, even if a rework cell wiring process is performed thereafter, this interconnection and the dummy wiring pattern never forms a short circuit. Moreover, the rework cell corresponding to the specific wiring pattern registered in the registration table 32 returns to a state where it is arranged, i.e. the state shown in FIG. 7A (note that the dummy wiring pattern 108 is absent). What should be noted here is that no change is added to a data format of the data registered in the layout data table 34. This data format is the same as conventional one. In addition, the data of the cell library 12 is also the same as conventional one. Thus, while making the best use of the function of the layout pattern generating apparatus, a new function can be added.

Then, step S10 is executed, and, as shown in FIG. 7B, the layout editing section 24 generates: as the in-cell wiring patterns, the voltage wiring pattern 122 extending from a power supply voltage pattern to a P-type diffusion layer pattern 102, a ground wiring pattern 124 extending from a ground voltage pattern to an N-type diffusion layer pattern 106; a pattern IN receiving an input signal addressed to the inverter; and a pattern OUT outputting an output signal of the inverter. Then, the layout editing section 24 registers the in-cell wiring patterns in the layout data table 34. As described above, the wiring patterns for permitting the rework cell to function as a logic cell are typically provided at the lowermost layer in the wiring layer. Moreover, as shown in FIG. 9, the layout editing section 24 generates inter-cell wiring patterns 132 and 134 at a higher wiring layer and registers them in the layout data table 34.

In this manner, the layout pattern of the semiconductor device can be generated efficiently. In this case, without adding particular changes such as a data format change to a conventional layout pattern generating apparatus, the rework cell can be easily changed to the logic cell, and, furthermore, a short circuit is not generated.

It should be noted that if the net list 10 is changed via the input unit 4 in accordance with user instructions to specify the above rework cell, the layout editing section 24 can automatically perform the in-cell wiring of the rework cell and inter-cell wiring.

Figure 4:
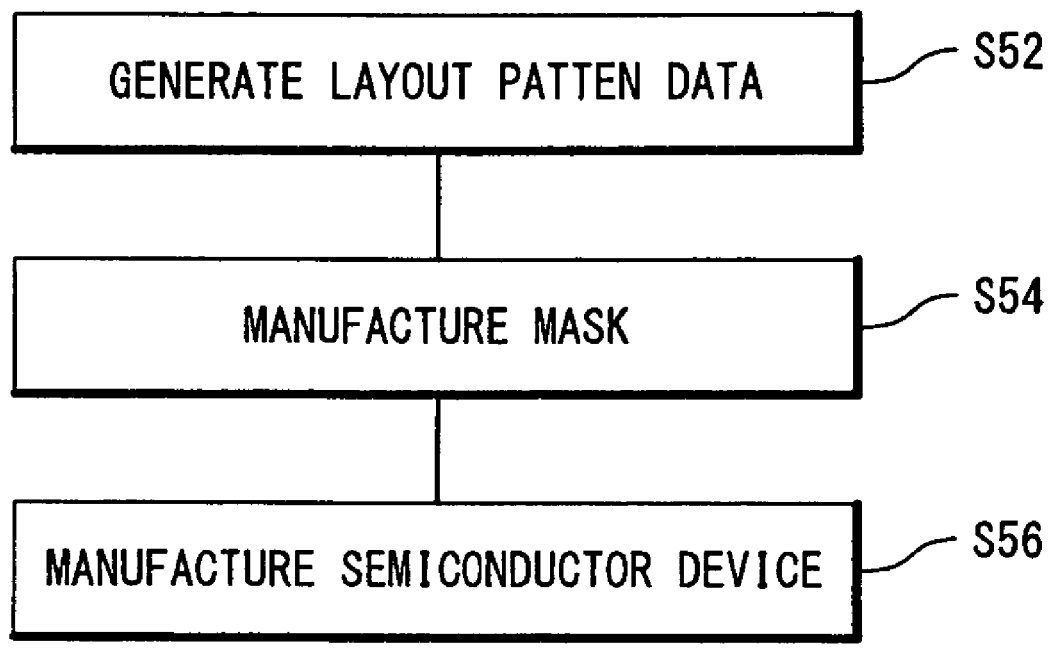
FIG. 4 is a flowchart showing a semiconductor device manufacturing method using a layout pattern generating method according to the present invention.

Next, a method of manufacturing the semiconductor device according to the present invention will be described with reference to FIG. 4.

At step S52, using the layout generating apparatus according to the present invention, the layout pattern data is generated, as described above. Subsequently, at step S54, various masks are fabricated by using the generated layout pattern data. Finally, at step S56, the semiconductor device is manufactured on a substrate such as a silicon wafer by using these masks.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A layout pattern generating apparatus comprising:
a net list configured to store connection data in a semiconductor device;
a cell library in which pattern data of a plurality of cells including rework cells and fill cells are stored;
a display unit; and
a layout pattern generating and editing section configured to arrange said pattern data of the plurality of cells, including the rework cells and the fill cells, in a semiconductor chip area, based on said connection data, to display on said display unit, to calculate a distribution of wiring occupation rates in the semiconductor chip area and an average of the wiring occupation rates, and to generate a layout pattern in which a dummy wiring pattern is arranged in a wiring layer, based on the distribution and the average of the wiring occupation rates,
wherein said layout pattern generating and editing section generates a new layout pattern by deleting said dummy wiring pattern, specifying a specific rework cell among arranged rework cells, generating a specific pattern of a predetermined shape in the wiring layer of said specific rework cell of the new layout pattern, arranging a new dummy wiring pattern in at least a part of said wiring layer of un-specific rework cells of said rework cells other than said specific rework cell and said fill cells, deleting said specific pattern from the wiring layer of said specific rework cell, arranging said specific rework cell as a logic cell, and arranging a wiring pattern in said wiring layer of said specific rework cell, when a part of the arranged rework cells is used as the logic cell.

2. The layout pattern generating apparatus according to claim 1, wherein said layout pattern generating and editing section specifies a rework cell indicated on a screen of said display unit as said specific rework cell.

3. The layout pattern generating apparatus according to claim 1, wherein said specific pattern of the predetermined shape comprises a pattern of fully covering said selected rework cell.

4. The layout pattern generating apparatus according to claim 1, wherein said layout pattern generating and editing section sets an arrangement area in said semiconductor chip area based on said wiring occupation rates and said average, and arranges said dummy wiring pattern in the set arrangement area.

5. The layout pattern generating apparatus according to claim 1, wherein said layout pattern generating and editing section specifies a plurality of rework cells indicated on said display unit as a plurality of specific rework cells and registers identification data of said plurality of specific rework cells on a temporary registration table in no relation with attributes of the specific rework cells.

6. The layout pattern generating apparatus according to claims 5, wherein said layout pattern generating and editing section collectively deletes said specific pattern from the plurality of specific rework cells based on said identification data.

7. The layout pattern generating apparatus according to claim 1, wherein the specific rework cell comprises a plurality of layers including:
a bottom layer comprising a lowermost layer of the specific rework cell; and
a second layer comprising the wiring layer, and being disposed above the bottom layer.

8. The layout pattern generating apparatus according to claim 7, wherein, when the wiring pattern of the specific rework cell is used as the logic cell, the layout generating and editing section generates an inter-cell wiring pattern as the wiring layer.

9. The layout pattern generating apparatus according to claim 1, wherein, when the net list is changed, the layout generating and editing section performs an in-cell wiring of the specific rework cell.

10. A layout pattern generating apparatus comprising:
a cell library that stores pattern data of a plurality of cells including:
a plurality of rework cells; and
a plurality of fill cells;
a net list that stores connection data of the plurality of cells;
a layout pattern generating section that arranges the pattern data of the plurality of cells in a pattern semiconductor chip area based on the connection data stored in the net list, calculates distribution and average wiring occupation rates of the semiconductor chip area, and based on the distribution and average wiring occupation rates, generates a first layout pattern in which a first dummy wiring pattern is arranged in a wiring layer of an area of the semiconductor chip area; and
a layout editing section that generates a specific pattern of a predetermined shape in the wiring layer of a specific rework cell of the plurality of rework cells,
wherein the layout editing section generates a second layout pattern by deleting the first dummy wiring pattern, specifying the specific rework cell of the plurality of rework cells, and arranging a second dummy wiring pattern in a wiring layer of at least another rework cell of the plurality of rework cells other than the specific rework cell and the plurality of fill cells,
wherein, after arranging the second dummy wiring pattern, the layout editing section deletes the specific pattern from the wiring layer of the specific rework cell, and arranges the specific rework cell as a logic cell, and
wherein, when a part of the plurality rework cells are used as the logic cell, the layout editing section arranges a wiring pattern in the wiring layer of the specific rework cell.

11. The layout pattern generating apparatus according to claim 10, wherein, before the layout editing section generates the specific pattern of the predetermined shape, the layout editing section determines if a target occupation rate of the semiconductor chip area has been attained.

12. The layout pattern generating apparatus according to claim 11, wherein the target occupation rate is attained, if the specific pattern covers an area where the first dummy wiring pattern was located.

* * * * *